United States Patent [19]
Goman (Gomez) Peter M. et al.

[11] Patent Number: 5,346,959
[45] Date of Patent: Sep. 13, 1994

[54] FUNCTIONALIZED ETHYLENE OXIDE ANTISTATIC AGENTS FOR ABS/SMA BLENDS

[75] Inventors: Goman (Gomez) Peter M., Tarrytown, N.Y.; Kishore Udipi, Longmeadow; Lionel R. Stebbins, Belchertown, both of Mass.

[73] Assignee: Monsanto Company, St. Louis, Mo.

[21] Appl. No.: 95,291

[22] Filed: Jul. 21, 1993

Related U.S. Application Data

[63] Continuation-in-part of Ser. No. 827,440, Jan. 19, 1992, abandoned.

[51] Int. Cl.⁵ .................. C08L 25/08; C08L 55/02; C08L 71/02
[52] U.S. Cl. ................... 525/187; 524/504; 524/910; 524/912; 525/366; 525/382
[58] Field of Search ............. 525/187, 366, 382; 524/910, 912, 504

[56] References Cited

U.S. PATENT DOCUMENTS

| | | | |
|---|---|---|---|
| 4,634,732 | 1/1987 | Miller et al. | 524/504 |
| 4,746,697 | 5/1988 | Yamaguchi et al. | 524/232 |
| 5,010,139 | 4/1991 | Yu | 524/397 |
| 5,077,330 | 12/1991 | Ehrhart et al. | 524/314 |

FOREIGN PATENT DOCUMENTS

| | | |
|---|---|---|
| 0434011 | 6/1991 | European Pat. Off. . |
| 0443767 | 8/1991 | European Pat. Off. . |
| 54-001362 | 1/1979 | Japan . |
| 59-142242 | 8/1984 | Japan . |
| 59-142243 | 8/1984 | Japan . |
| 3239745 | 10/1991 | Japan . |
| 9109906 | 7/1991 | PCT Int'l Appl. . |
| 2139230 | 11/1984 | United Kingdom . |

OTHER PUBLICATIONS

"The Jeffamine Polyoxyalkyleneamine" Texaco Chemical Company.

*Primary Examiner*—James J. Seidleck
*Assistant Examiner*—Thomas Hamilton, III
*Attorney, Agent, or Firm*—Mary R. Bonzagni

[57] ABSTRACT

An antistatic agent for thermoplastic polymers is provided wherein the antistatic agent is comprised of a functionalized alkylene oxide polymer and optionally a minor amount of an alkali or alkaline earth metal salt capable of complexing with the functionalized alkylene oxide polymer and wherein the thermoplastic polymers include styrenic polymers such as ABS; blends of an ABS copolymer and a styrene-maleic anhydride copolymer; or nylon 6.

13 Claims, No Drawings

FUNCTIONALIZED ETHYLENE OXIDE ANTISTATIC AGENTS FOR ABS/SMA BLENDS

RELATED APPLICATION

This is a continuation-in-part of pending application Ser. No. 07/827,440, filed Jan. 29, 1992.

BACKGROUND OF THE INVENTION

The present invention relates generally to an antistatic agent for thermoplastic polymers and to thermoplastic compositions containing such an agent.

Many thermoplastic compositions, including ABS compositions, exhibit relatively slow electrostatic charge dissipation rates which make them unacceptable for many applications, i.e., housing for optical and magnetic recording media, medical devices and military equipment.

One method used to raise the electrostatic charge dissipation rates of these compositions is to incorporate a hydrophilic, moderately incompatible material with antistatic properties into the composition.

Types of these so-called "internal" antistatic materials or agents include ethoxylated amine chemicals and homopolymers and copolymers of ethylene oxide, such as polyethylene oxide and epichlorohydrin rubber.

These antistatic agents function by continually migrating to the surface of the composition, because of their limited compatibility, to form a continuous film on the surface. Moisture is attracted to the surface of the composition by these antistatic agents thereby decreasing the static charge.

Unfortunately, the antistatic agents currently known have certain disadvantages. Included among these disadvantages are degradation of the compositions physical and mechanical properties due to the presence of the antistatic agent; inadequate electrostatic charge dissipation rates; functional dependence on the amount of moisture in the surrounding atmosphere; and reduction over time of the antistatic agents ability to decay surface charge as a result of wiping, rinsing, aging or blooming of the agent.

It is therefore a primary object of the present invention to provide an antistatic agent that is durable; serves to maintain or enhance the host compositions' mechanical properties; and which produces a highly conductive antistatic thermoplastic composition irrespective of the amount of moisture in the surrounding atmosphere.

It is a further object of the present invention to provide an antistatic thermoplastic composition that incorporates the inventive antistatic agent.

SUMMARY OF THE INVENTION

The present invention is directed to an antistatic agent for thermoplastic polymers and to thermoplastic compositions containing such an agent. The antistatic agent comprises a functionalized alkylene oxide polymer selected from the group consisting of polyethylene oxide, polypropylene oxide, polybutylene oxide, copolymers of ethylene oxide and propylene oxide, and polydimethylsiloxane carbinol terminated poly(ethylene oxide-dimethylsiloxane-ethylene oxide) ABA block copolymers and blends thereof where the functional group of the functionalized alkylene oxide polymer is selected from the group consisting of hydroxy, epoxy and amino groups, such as the series of polyether diamines having molecular weights ranging from 600 to 6,000 sold by Texaco Chemical Company under the trademark Jeffamine ™ ED; and optionally a minor amount of an alkali or alkaline earth metal salt.

It has been found that thermoplastic compositions containing the inventive antistatic agent demonstrate an acceptable balance of mechanical properties and a high level of static charge decay.

DETAILED DESCRIPTION OF THE INVENTION

The antistatic agent of the present invention is comprised of a functionalized alkylene oxide polymer and optionally a minor amount of an alkali or alkaline earth metal salt capable of complexing with the functionalized alkylene oxide polymer.

Preferably, the antistatic agent comprises a functionalized alkylene oxide polymer and a minor amount of an alkali or alkaline earth metal salt. More preferably, the antistatic agent is comprised of from 99.9 to 90% by weight of the polymer and from 0.1 to 10% by weight of the metal salt.

The alkylene oxide polymers that are contemplated by the present invention include polyethylene oxide, polypropylene oxide, polybutylene oxide, copolymers of ethylene oxide and propylene oxide, and polydimethylsiloxane carbinol terminated poly(ethylene oxide-dimethyl-siloxane-ethylene oxide) ABA block copolymers and blends thereof, the preferred alkylene oxide polymers being polyethylene oxide homopolymers and copolymers of ethylene oxide and propylene oxide.

The preferred copolymers of ethylene oxide and propylene oxide are water soluble block or segmented copolymers based on a predominantly polyethylene oxide backbone where at least one internal block or segment of the copolymer comprises ethylene oxide repeating units or ethylene oxide propylene oxide random repeating units. The end blocks or caps are polypropylene oxide end blocks or caps which aid in the functionalization of the ends of the copolymers.

The functional groups for the alkylene oxide polymer of the present invention include hydroxy, epoxy and amino groups, with hydroxy and amino groups being preferred. The preferred functionalized polymers are amine functionalized polyethylene oxide homopolymers and amine functionalized copolymers of ethylene oxide and propylene oxide.

Preferred amine functionalized copolymers of ethylene oxide and propylene oxide having at least one internal block comprising ethylene oxide repeating units can be represented generally by the following formula:

where a + c and b have the following approximate values over the approximate molecular weight range of 600 to 4,000:

| APPROXIMATE MOL. WT. | APPROXIMATE VALUE | |
| --- | --- | --- |
| | a + c | b |
| 600 | 2.5 | 8.5 |
| 900 | 2.5 | 15.5 |
| 2,000 | 2.5 | 40.5 |
| 4,000 | 2.5 | 86.0 |

Preferred amine functionalized copolymers of ethylene oxide and propylene oxide having at least one internal block comprising ethylene oxide propylene oxide random repeating units have additional propylene oxide in the backbone as compared to the copolymers described immediately hereinabove and preferably have an approximate molecular weight of 6000.

The preferred amine functionalized copolymers of the present invention are sold by Texaco Chemical Company under the trademark Jeffamine ™ ED and reportedly have the following typical properties:

| | JEFFAMINE ™ ED COPOLYMERS | | | |
|---|---|---|---|---|
| APPROXIMATE MOL. WT. | TOTAL ACETYLATABLES, meq/g* | TOTAL AMINE, meq/g | PRIMARY AMINE, meq/g | WATER wt. % |
| 600 | 3.27 | 3.19 | 3.13 | 0.10 |
| 900 | 2.15 | 2.05 | 2.01 | 0.10 |
| 2000 | 0.96 | 0.88 | 0.87 | 0.14 |
| 4000 | 0.51 | 0.45 | 0.43 | 0.10 |
| 6000 | 0.35 | 0.27 | 0.26 | 0.10 |

*meq/g = milliequivalents per gram.

Alkali and alkaline earth metal salts used in the present invention are those metal salts that are capable of complexing with the functionalized alkylene oxide polymer. Preferred are those metal salts with small cations and large anions, such as lithium chloride, lithium bromide, lithium acetate, lithium carbonate, lithium trifluoromethyl sulphonate and sodium acetate.

The preferred antistatic agent is comprised of from 99.9 to 90% by weight of an amine functionalized ethylene oxide polymer and from 0.1 to 10% by weight of lithium chloride or lithium trifluoromethyl sulphonate.

The alkali or alkaline earth metal salt is added to the functionalized alkylene oxide polymer by preferably first forming an aqueous solution of the metal salt and then adding this solution to the warm liquid polymer.

The thermoplastic composition of the present invention comprises a thermoplastic polymeric component and the antistatic agent set forth above.

The thermoplastic polymeric components include, but are not limited to, styrenic polymers, polyamides, polycarbonates, polyolefins, polyureas, polyurethanes and blends thereof. Styrenic polymers include polystyrene, styrene-acrylonitrile copolymers, acrylonitrile-butadiene-styrene copolymers, acrylonitrile-styrene-acrylate copolymers, methacrylate-butadiene-styrene copolymers, styrene-maleic anhydride copolymers, styrene-methyl methacrylate copolymers, styrenemaleic anhydride-methyl methacrylate copolymers and blends thereof. The polyamides include homopolymers and copolymers of polyamides and mixtures thereof. Examples of the polyamide resins are homopolymers such as nylon 6, nylon 66, nylon 4, nylon 8, nylon 11, nylon 12, nylon 69, nylon 610, and nylon 612; and copolymers such as nylon 6/66, nylon 6/12, nylon 6/69, and lactam-lactone copolymers. Preferably, the polymeric component is acrylonitrile-butadiene-styrene copolymer; a blend of from 98 to 80% by weight acrylonitrile-butadiene-styrene copolymer and from 2 to 20% by weight styrene-maleic anhydride copolymer; nylon 6; nylon 66; or nylon 6/66 copolymer.

A preferred styrenic polymer blend comprises from 98 to 80 weight percent acrylonitrile-butadiene-styrene copolymer and from 2 to 20 weight percent styrene-maleic anhydride copolymer. The hydroxy, epoxy or amine functionalized ethylene oxide polymer is blended with the styrenic polymer blend to provide a mole ratio of anhydride groups to functional groups in the range of from about 5:1 to 12:1.

It has been observed that when a polyamide polymeric component is used, addition of an alkali or alkaline earth metal salt alone will result in a composition displaying comparable antistatic properties to those realized by compositions employing the antistatic agent set forth above.

The antistatic agent may be incorporated into the thermoplastic polymeric component of the inventive antistatic thermoplastic composition by conventional melt blending techniques, such as reactive extrusion or mixing in a Banbury mixer where residual water is flashed off followed by a drying step just prior to feeding to a pelletizing device.

The antistatic agent may also be incorporated into the thermoplastic polymeric component by copolymerizing the antistatic agent with copolymerizable monomers of the polymeric component. This is especially useful with polyamides.

In a preferred embodiment, the antistatic thermoplastic composition of the present invention is comprised of (1) from 93 to 80% by weight of acrylonitrile-butadiene-styrene copolymer; and (2) from 7 to 20% by weight of an antistatic agent comprising a) from 99.9 to 90% by weight of an amine functionalized ethylene oxide polymer; and b) from 0.1 to 10% by weight of lithium chloride or lithium trifluoromethyl sulphonate.

In a more preferred embodiment, the antistatic thermoplastic composition is comprised of (1) from 93 to 80% by weight of a styrenic polymer blend comprising a) from 98 to 80% by weight of acrylonitrile-butadiene-styrene copolymer; and b) from 2 to 20% by weight of styrene-maleic anhydride copolymer; and (2) from 7 to 20% by weight of an antistatic agent comprising a) from 99.9 to 90% by weight of an amine functionalized ethylene oxide polymer; and b) from 0.1 to 10% by weight of lithium chloride or lithium trifluoromethyl sulphonate. In the more preferred embodiment, it is further preferred that the mole ratio of free amine to anhydride in the inventive composition be about 1:5. It is believed that the reactive anhydride groups in the styrene-maleic anhydride copolymer anchor the ethylene oxide polymer through the amine groups.

In another more preferred embodiment, the antistatic thermoplastic composition is comprised of (1) from 93 to 80% by weight of nylon; and (2) from 7 to 20% by weight of an antistatic agent comprising (a) from 99.9% to 90% by weight of amine functionalized polyethylene oxide; and (b) from 0.1 to 10% by weight of lithium chloride or lithium trifluoromethyl sulphonate.

Other known additives, such as impact modifiers, pigments, lubricants, stabilizers, fillers, antioxidants and flow aids may also be included in the antistatic thermoplastic compositions of the present invention provided such additives do not adversely affect the static charge decay abilities of the resulting composition.

In addition to the above description, the antistatic agent and antistatic thermoplastic composition of the present invention are further developed by reference to the illustrative, but not limiting, examples set forth below.

WORKING EXAMPLES

In the Working Examples set forth below, the following components were used:

ABS-a rubber graft copolymer of butadiene and styrene (90/10% by weight) grafted with styrene and acrylonitrile wherein 65% by weight is styrene and 35% by weight is acrylonitrile. This intermediate ABS was further diluted with styrene acrylonitrile copolymer as set forth below.

SAN-a copolymer of 68% by weight based on the weight of the copolymer of styrene and 32% by weight of acrylonitrile.

SMAMMA-a copolymer of 68% by weight based on the weight of the copolymer of styrene; 25% by weight of maleic anhydride; and 7% by weight of methylmethacrylate.

N6-nylon 6 prepared as set forth herein.

PED [mol. wt.]-polyether diamines which are predominantly polyethylene oxide with some polypropylene oxide sold by Texaco Chemical Company under the name Jeffamine ™ ED series. Bracketed number denotes molecular weight.

PPP [mol. wt. range: EO% range]-polydimethylsiloxane carbinol terminated poly(ethylene oxide-dimethylsiloxane-ethylene oxide) ABA block copolymer available from Huls America. Bracketed numbers denote molecular weight range; ethylene oxide percentage range.

PEO [mol. wt.]-polyethylene oxide available from Union Carbide Company. Bracketed number denotes molecular weight.

PEDO-polyether diol available from Union Carbide Company.

PEG [mol. wt.]-polyethylene glycol available from Union Carbide Company. Bracketed number denotes molecular weight.

PAAS-poly(styrene-4-sulphonate) sodium salt sold by Scientific Polymer Products Company.

PSSS-poly(acrylic acid) sodium salt sold by Scientific Polymer Products Company.

MGS-magnesium stearate available from C. P. Hall Co.

A-410- ethoxylated alkyl amine sold by Akzo Chemie America under the name Armostat 410.

A-C-a bis-ethylene diamine stearamide sold by Lonza Inc. under the name Acrawax C.

S-160-n-butylbenzyl phthalate sold by Monsanto Chemical Company under the name Santicizer-160.

I-1076-a hindered phenol type antioxidant sold by Ciba-Geigy Corp. under the name of Irganox 1076.

CATALYST-a magnesium bromide caprolactam adduct with a melting point of about 70° C having a concentration of 1.0 mole of magnesium bromide per kilogram of caprolactam (21.6 wt. % adduct; 78.4 wt. % caprolactam) obtained from Grant Chemical Division of Ferro Corporation of Baton Rouge, La.

INITIATOR-isophthaloyl biscaprolactam prepared by adding one (1) mole of bisacyldichloride to two (2) moles of caprolactam. The HCl formed was neutralized with an amine and the product recovered.

The following laboratory reagent grade chemicals were obtained from Aldrich Chemical Company and used without further purification:

Lithium Chloride (LiCl)
Lithium Acetate (LiOAc)
Lithium Carbonate ($Li_2Co_3$)
Lithium Trifluoromethyl Sulphonate ($LiCF_3SO_3$)
Sodium Acetate (NaOAc)

SAMPLE PREPARATION

PART 1-COMPOUNDING

The Working Examples set forth below, with the exception of the antistatic polyamide compositions, were prepared by compounding using a 3.4 kg. Banbury mixer. All solid intermediates including polymeric components and additives such as antioxidants and flow aids were weighed and dry blended before adding to the Banbury mixer once the correct operating temperatures were reached.

Low molecular weight PEO additives, having a molecular weight of less than or equal to 6000, which were generally waxy solids at room temperature, were preweighed into glass jars and melted in a microwave oven just before adding to the Banbury mixer.

Examples containing PED coordinated with alkali or alkaline earth metal salts were prepared by first dissolving the salt as a 10 to 20% solution in water and gradually adding this solution to mechanically stirred liquid PED, melted at 50° to 60° C. The resulting aqueous PED/alkali or alkaline earth metal salt was then added to the dry blend in the Banbury mixer.

Working Examples containing polymeric sodium salts, poly(acrylic acid) and poly(styrene-4-sulfonate), were prepared by mixing these additives in with the dry blend in the Banbury mixer.

High gloss working examples which used high molecular weight PEO (MW>6000) coordinated with an alkali or alkaline earth metal salt were prepared by mixing the PEO with the dry blend and adding an aqueous solution of 10 to 20% by weight alkali or alkaline earth metal salt directly to the Banbury mixer.

Set conditions for the Banbury mixer were as follows:

| | |
|---|---|
| Circulating Oil Temperature | 107° C. |
| Rotor Speed | 100 rpm |
| Ram Weight Air Pressure | 0.41–0.55 MPa |
| Post Flux Dump Time | 60–80 sec. |
| Dump Temperature | 216° C. |

The compounded blends were dried thoroughly in a hot air circulating oven at 75° to 80° C. for 24 hours or in a vacuum oven with a nitrogen bleed for 18 hours at the same temperature, prior to injection molding test specimens.

Molding was carried out on a 4 oz. Arburg molding machine under the following general conditions:

| | | |
|---|---|---|
| Zone 1 Temp., ° C. | 225 | 225 |
| Zone 2 | 225 | 225 |
| Zone 3 | 230 | 230 |
| Nozzle Temp., ° C. | 230 | 230 |

-continued

| | | |
|---|---|---|
| Screw Speed, rpm | 200 | 200 |
| Injection Pressure, MPa | 7.41 | 7.65 |
| Mold Temp., °C. | 120 | 120 |

The freshly molded specimens were conditioned for at least 24 hours at 23° C. at 50% relative humidity unless otherwise stated.

PART 2-COPOLYMERIZATION

Examples 33 to 39 below illustrate the incorporation of the antistatic agent into a polyamide by copolymerization of a polyamide forming monomer with the metal salt complexes used as antistatic agents in the present invention. In Examples 33 to 38, caprolactam is used as the polyamide forming monomer while in Example 39, a combination of caprolactam and caprolactone is used to form a nylon copolymer having the antistatic agent as part of the copolymer backbone. When caprolactone is present it complexes with the metal salt, e.g. LiCl. The examples were prepared as follows: the metal salt was dissolved in water and an antistatic agent component (i.e., PEO; PED; PEDO; or PEG) was weighed out into a heated glass jar and then agitated on a magnetic stirring hot plate. During agitation, the metal salt-/water solution was added and the resulting mixture agitated on the magnetic stirring hot plate for 2 to 5 minutes. The mixture was then dried overnight in a vacuum oven at 90° C. under full vacuum. Hot molten caprolactam (<100 ppm moisture; mp=about 69° C.) or caprolactone (distilled prior to use) was added to the dried mixture and the mixture maintained at between 110° and 130° C. until the caprolactam or caprolactone was dissolved. Upon dissolution, the initiator was added to form Reactant A.

In a second glass jar, caprolactam was weighed out and the catalyst dissolved therein to form Reactant B.

Reactant A and Reactant B were then mixed together and the resulting mixture poured into a 160° C. stationary mold and allowed to polymerize. Polymerization times ranged from 5 to 7 minutes.

Test bars were routed from the resulting plaques and conditioned for at least 24 hours at 23° C. at 50% relative humidity prior to testing.

TEST METHODS

The molded specimens and test bars were then subjected to the following tests:
Tensile properties-ASTM D636;
Flexural properties-ASTM D790;
(Tensile and Flexural properties were measured on an Instron tester using 0.32 cm. tensile bars or 12.7 cm.×1.27 cm.×0.32 cm. bars.)
Notched Izod Impact-ASTM D256;
HDTUL-ASTM D648 at 0.46 MPa fiber stress;
Vicat softening point-ASTM D1525 under 1 Kg load;
Multiaxial Inverted Dart Impact (IDI)-The IDI determination utilized represents a modification of the test as described in Society of Plastics Engineers National Technical Conference "Plastics in Surface Transportation" Nov. 12–14, 1974, Detroit, Michigan, at page 238. In the modified test, instead of the dart being attached to the slider and striking the sample, the sample holder is attached to the slider and strikes the instrumented dart. The rotary potentiometer is not used. The instrumented dart used is 1.27 cm. in diameter, and the sample strikes the dart at a velocity of 140.2 m/min. The samples were injection molded into 7.62 cm.×10.2 cm.×0.32 cm. plaques and then cut into two 5.08 cm.×7.62 cm. pieces for testing. Results are given in Joules (J).

Surface Gloss-measured using a Gloss Guard 11 device at an angle of 60°.

% Charge Decay-a "Static Honest Meter" was used to measure dissipation of electrostatic charge according to saturation charged voltage. An electric charge was accumulated on the surface of the sample, until it reached a saturation voltage of 700 v, by means of corona discharge. The discharge was then stopped and a sensing electrode used to record the surface electric charge decay with time in seconds. The % charge decay was then calculated from the data obtained at the specified time.

EXAMPLES C1 AND 1 TO 5

In these Examples, molded specimens containing PED and/or PPP and SMAMMA were tested for mechanical strength and static decay properties. The results are tabulated in Table I.

TABLE I

| SUMHARY OF EXAMPLES C-1 AND 1 TO 5 | | | | | | |
|---|---|---|---|---|---|---|
| EXAMPLE | C-1* | 1 | 2 | 3 | 4 | 5 |
| COMPONENTS (% by weight) | | | | | | |
| ABS | 35 | 35 | 35 | 35 | 35 | 35 |
| SAN | 65 | 50 | 50 | 50 | 50 | 50 |
| SMAMMA | — | 15 | 15 | 15 | 15 | 15 |
| ADDITIVES (pph) | | | | | | |
| PED [6000] | — | 5 | 10 | — | — | 5 |
| PPP [2200–2600, 45–55%] | — | — | — | 5 | 10 | 5 |
| A-C | 0.8 | 0.8 | 0.8 | 0.8 | 0.8 | 0.8 |
| I-1076 | 0.2 | 0.2 | 0.2 | 0.2 | 0.2 | 0.2 |
| % MA (mmoles/100 g) | 0 | 39 | 39 | 39 | 39 | 39 |
| % —NH$_2$ (mmoles/100 g) | 0 | 1.7 | 3.3 | 0 | 0 | 1.7 |
| Ratio MA/—NH$_2$ | — | 22.9 | 11.8 | — | — | 22.9 |
| PROPERTIES | | | | | | |
| Tensile Str (MPa) | 44.4 | 37 | 32.1 | 34.1 | 28.9 | 26.7 |
| Tensile Mod (GPa) | 2.7 | 2.3 | 2.4 | 2.5 | 2.3 | 2.1 |
| Elongation (%) | 6 | 42 | 83 | 23 | 6 | 5 |
| IDI Emax (J) | 4.7 | 9.2 | 23.1 | 6.6 | 5.4 | 11 |
| Efail (J) | 5.2 | 9.5 | 37.6 | 7.2 | 6.2 | 12.8 |
| Izod Impact Notched (KJ/m$_2$) | 11.8 | 9.6 | 26.8 (NB) | 7.5 (NB) | 6.7 | 11.7 |
| HDTUL (°C.) | 84 | 89 | 87 | 86 | 81 | 84 |
| Vicat, 1 Kg (°C.) | 103 | 112 | 111 | 108 | 104 | 107 |
| % Charge Decay at T = 10s. | 10 | 4 | 50 | 31 | 34 | 4 |

*C-1 contains 1% by weight of A-410.
NB = Not broken.

Examples 1 to 5 demonstrate the effect of adding PED and/or PPP to an ABS/SMAMMA blend.

Example 1 which incorporated PED and SMAMMA, although able to effect static decay, showed no static decay improvement over the Control C-1 which utilized the prior art antistatic agent, A-410, in the absence of SMAMMA. Example 2, in which the amount of PED was increased from 5 pph to 10 pph, as compared to Example 1, showed a substantial improvement in its ability to achieve fast static charge decay in addition to showing a substantial improvement in both IDI and notched Izod (no break in 7.62 cm. bars) impact properties. There was little change in the tensile modulus and heat (HDTUL at 87° C.) of Example 2 as compared to Example 1. Examples 3 and 4, which utilized 5 pph and 10 pph PPP respectively, demonstrated a similar ability to achieve fast static charge decay, as compared to Examples 1 and 2, although the resultant resin showed slightly lower impact properties.

Example 5 which incorporated 5 pph each of PED and PPP along with SMAM/MA also demonstrated an ability to achieve static charge decay and demonstrated improved impact properties as compared to Examples 3 and 4.

EXAMPLES C-2 AND 6 TO 10

In Examples C-2 and 6 to 10, molded specimens containing varying amounts of SAN, SMAMMA and PED were tested. The results are set forth in Table II.

TABLE II
SUMMARY OF EXAMPLES C-2 AND 6 TO 10

| EXAMPLE | C-2 | 6 | 7 | 8 | 9 | 10 |
|---|---|---|---|---|---|---|
| COMPONENTS (% by weight) | | | | | | |
| ABS | 35 | 35 | 35 | 35 | 35 | 35 |
| SAN | 55 | 55 | 60 | 55 | 55 | 55 |
| SMAMMA | 10 | 10 | 10 | 5 | 10 | 10 |
| ADDITIVES (pph) | | | | | | |
| PED [6000] | — | 10 | 8 | 10 | 15 | 20 |
| A-C | 0.8 | 0.8 | 0.8 | 0.8 | 0.8 | 0.8 |
| I-1076 | 0.2 | 0.2 | 0.2 | 0.2 | 0.2 | 0.2 |
| % MA (mmoles/100 g) | 26 | 26 | 13 | | | |
| % —NH$_2$ (mmoles/100 g) | 0 | 3.3 | 2.6 | | | |
| Ratio MA/—NH$_2$ | — | 7.9 | 4.9 | | | |
| PROPERTIES | | | | | | |
| Tensile Str (MPa) | 49.3 | 29.6 | 30.5 | 29.9 | 27.2 | 21.8 |
| Tensile Mod (GPa) | 2.8 | 2.4 | 2.5 | 2.1 | 2.1 | 1.7 |
| Elongation (%) | 7 | 97 | 112 | 92 | 55 | 78 |
| IDI Emax (J) | 1.3 | 14.5 | 20.6 | 16.7 | 18.5 | 11.6 |
| Efail (J) | 1.4 | 20.9 | 33.5 | 25 | 29.4 | 14.4 |
| Izod Impact Notched (KJ/m$_2$) | 3 | 26 | 26 | 28.1 | 25.8 | 22.7 |
| HDTUL (°C.) | 91 | 85 | 84 | 83 | 82 | ND |
| Vicat, 1 Kg (°C.) | 112 | 109 | 108 | 107 | 106 | ND |
| % Charge Decay at T = 10s. | 0.28 | 26 | 27 | 61 | 48 | 90 |

ND = Not Determined.

Examples 6 and 7 demonstrate the effect of varying the amounts of SAN, SMAMMA and PED in the blend. In particular, these Examples show the best combination of these components or the best mole ratio of free amine to anhydride in the blend in terms of achieving optimum mechanical properties.

From the results set forth in Table II, it appears that the best combination of impact, heat and modulus is obtained in Example 7 with 5% SMAMMA and 8 pph PED with a mole ratio of free amine to anhydride in the blend of approximately 1:5.

Examples 8 to 10 show the effect of increased amounts of PED on the mechanical properties of the blend. From the results set forth in Table II, it appears that although increased amounts of PED in the ABS/-SMAMMA blend typically improve the blends static charge decay ability amounts in excess of 15 pph adversely affect the blends mechanical properties.

EXAMPLES C-3 AND 11 TO 21

In these Examples, the effect of lithium chloride addition on the molded specimens' mechanical strength and static decay properties were measured. The results are tabulated in Table III. In Examples 15 to 21, the amounts of each additive are expressed as parts per hundred parts of the polymeric component.

TABLE III
SUMMARY OF EXAMPLES C-3 AND 11 TO 21

| EXAMPLE | C-3 | 11 | 12 | 13 | 14 | 15 | 16 | 17 | 18 | 19 | 20 | 21 |
|---|---|---|---|---|---|---|---|---|---|---|---|---|
| COMPONENTS (% by weight) | | | | | | | | | | | | |
| ABS | 32 | 32 | 32 | 32 | 32 | 34.7 | 35 | 33 | 30 | 33 | 30 | 35 |
| SAN | 55 | 55 | 55 | 55 | 55 | 59.8 | 60 | 62 | 65 | 62 | 65 | 60 |
| SMAMMA | 5 | 5 | 5 | 5 | 5 | 5.4 | 5 | 5 | 5 | 5 | 5 | 5 |
| ADDITIVES | | | | | | | | | | | | |
| PED [6000] | 7 | 7 | 7 | 7 | 7 | 11 | | | | | | |
| LiCl | 0 | 0.2 | 0.5 | 1 | 1.5 | 1 | | | | | | |
| PED/LiCl (6 g/10 g/100 g LiCl /H$_2$O/PED) | | | | | | | 10 | 10 | 10 | 10 | 10 | 10 |
| LiCl (%) | | | | | | | 7.75 | 7.75 | 7.75 | 11.1 | 11.1 | 11.1 |
| A-C | | | | | | | 0.47 | 0.47 | 0.47 | 0.67 | 0.67 | 0.67 |
| S-160 | 0.8 | 0.8 | 0.8 | 0.8 | 0.8 | 0.8 | 1 | 1 | 1 | 1 | 1 | 1 |
| I-1076 | 0.2 | 0.2 | 0.2 | 0.2 | 0.2 | 0.2 | 0.2 | 0.2 | 0.2 | 0.2 | 0.2 | 0.2 |
| PROPERTIES | | | | | | | | | | | | |
| IDI Emax (J) | 17.6 | 7.1 | 5.8 | 4.5 | 4.2 | 4.5 | 5.7 | 4.7 | 6 | 2.9 | 2.6 | 6.1 |
| Efail (J) | 24.7 | 9.4 | 9.5 | 9.3 | 8.1 | 8 | 7.3 | 6.8 | 8.3 | 5.9 | 5.3 | 8.1 |
| Izod, Notched (KJ/M$_2$) | 21.5 | 10.9 | 9.7 | 8.1 | 6.9 | 8.3 | 18 | 17.2 | 15 | 14 | 13.9 | 18.1 |
| % Charge Decay at T = 10s. | 4 | 8 | 12 | 26 | 43 | 81 | — | — | — | — | — | — |

Examples 11 to 15, prepared by incorporating LiCl, suspended in PED, in with the ABS/SMAMMA blend in a Banbury mixer, demonstrate the effect of LiCl addition on the resulting blends' static charge decay ability.

Examples C-3 and 11, as set forth in Table III, show that the addition of LiCl suspended in PED to the ABS/SMAMMA blend results in an improvement in static charge decay ability. Examples C3 to 14 demonstrate that as the % LiCl level increased from 0 to 1.5%, the static charge decay ability also increased. Examples 13 and 15 show that increasing the amount of PED favorably affects the static charge decay ability and does not affect the materials impact properties. It was observed that materials molded from the blends with higher salt contents showed phase separated crystals of LiCl on the surface. This may account for the improved static charge decay and the lower observed impact strengths of these materials.

Examples 16 to 20 show the effect of using the preferred preparation method initially set forth and varying the amounts of polymeric component levels on the resulting materials impact strength.

Examples 16 to 20 demonstrate, in general, that preparation of these blends according to the preferred preparation method, in comparison to the method outlined for Examples 11 to 15 above, favorably effects the resulting materials Izod strength. Examples 16 to 18 show that decreasing the ABS level understandably results in slightly decreased Izod strengths. Example 19, in comparison to Example 17, and Example 20, in comparison to Example 18, demonstrate that increased levels of PED and LiCl also result in slightly decreased Izod strengths.

Example 21 represents an optimized blend that demonstrates good mechanical properties and notable % Charge Decay at T=10s. Example 21 incorporates S-160 instead of A-C plasticizer.

EXAMPLES C-4 AND 22 TO 24

In Examples C-4 and 22 to 24, certain polymeric salts were evaluated in place of LiCl according to the formulations set forth below in Table IV.

TABLE IV

| SUMMARY OF EXAMPLES C-4 AND 22 TO 24 | | | | |
|---|---|---|---|---|
| EXAMPLE | C-4 | 22 | 23 | 24 |
| COMPONENTS (% by weight) | | | | |
| ABS | 35 | 35 | 35 | 35 |
| SAN | 60 | 60 | 60 | 60 |
| SMAMMA | 5 | 5 | 5 | 5 |
| ADDITIVES (pph) | | | | |
| PED [6000] | 15 | 15 | 15 | 15 |
| PSSS | — | 2 | — | — |
| PAAS | — | — | 2 | 5 |
| PROPERTIES | | | | |
| Tensile Str. (MPa) | 33 | 24 | 24.12 | 24.1 |
| Tensile Mod. (GPa) | 2.31 | 2.43 | 2.1 | 2.1 |
| Elongation (%) | 56 | 12 | 15 | 20 |
| IDI Emax (J) | 16.6 | 4.1 | 4 | 2.1 |
| Efail (J) | 22 | 7.5 | 6.4 | 5.4 |
| Izod, Notched (KJ/m$^2$) | 14.3 | 11.7 | 9.9 | 5.5 |
| HDT, 1.82 MPa (°C.) | 82 | 81 | 80 | 81 |
| Vicat 1 Kg (°C.) | 106 | 106 | 106 | 106 |
| % Charge Decay at T = 10 s. | 15 | 67 | 79 | 81 |

Examples 22 to 24, in comparison to Control C-4, demonstrate that both polymeric salts utilized are successful in effecting rapid charge decay. Although the impact properties of these materials was decreased, these properties are still within acceptable limits for some applications.

EXAMPLES C-5 AND 25 TO 28

In Examples C-5 and 25 to 28, several alternative salts were evaluated in place of LiCl. The results are tabulated in Table V.

TABLE V

| SUMMARY OF EXAMPLES C-5 AND 25 TO 28 | | | | | |
|---|---|---|---|---|---|
| EXAMPLE | C-5 | 25 | 26 | 27 | 28 |
| COMPONENTS (% by weight) | | | | | |
| ABS | 35 | 35 | 35 | 35 | 35 |
| SAN | 60 | 60 | 60 | 60 | 60 |
| SMAMMA | 5 | 5 | 5 | 5 | 5 |
| ADDITIVES (pph) | | | | | |
| PED [6000] | 13 | 13 | 13 | 13 | 13 |
| PSSS | LiCl | LiOAc | Li$_2$CO$_3$ | LiCF$_3$SO$_3$ | NaOAc |
| PAAS | 0.5 | 0.5 | 0.5 | 0.5 | 0.5 |
| PROPERTIES | | | | | |
| Tensile Str. (MPa) | 26.4 | 24.2 | 23.8 | 25.5 | 24.5 |
| Tensile Mod. (GPa) | 1.55 | 1.42 | 1.46 | 1.48 | 1.39 |
| Elongation (%) | 85 | 120 | 93 | 69 | 129 |
| Flex Strength (MPa) | 39.2 | 36.5 | 39 | 40.9 | 39.6 |
| Flex Mod (GPa) | 1.59 | 1.48 | 1.52 | 1.63 | 1.46 |
| IDI Emax (J) | 15.2 | 16.7 | 17 | 17.4 | 16.8 |
| Efail (J) | 22.4 | 24.6 | 26.3 | 29 | 23.5 |
| Izod, Notched (KJ/m$^2$) | 25.7 | 22.7 | 25.6 | 31.1 | 18.1 |
| HDT, 1.82 MPa (°C.) | 79 | 80 | 79 | 79 | 79 |
| Vicat 1 Kg (°C.) | 103 | 104 | 104 | 102 | 103 |
| % Charge Decay at T = 10 s. | 98 | 71 | 77 | 98 | 87 |

Examples 25 to 28 demonstrate the ability of salts other than LiCl to effect comparable static decay while maintaining or improving the resultant blends' mechanical properties. Most notable is Example 27, which incorporates lithium trifluoromethyl sulphonate (triflate) salt, and which demonstrates comparable % Charge Decay as in Control C-5 utilizing LiCl, but which results in a blend with improved impact strength.

EXAMPLES C-6 AND 29 TO 32

In Examples C-6 and 29 to 32, high molecular weight PED's complexed with LiCl were used in melt blends with ABS/SMAMMA to achieve antistatic materials with high surface gloss. The results are tabulated in Table VI.

TABLE VI

| SUMMARY OF EXAMPLES C-6 AND 29 TO 32 | | | | | |
|---|---|---|---|---|---|
| EXAMPLE | C-6 | 29 | 30 | 31 | 32 |
| COMPONENTS (% by weight) | | | | | |
| ABS | 35 | 35 | 35 | 35 | 35 |
| SAN | 60 | 60 | 60 | 60 | 60 |
| SMAMMA | 5 | 5 | 5 | 5 | 0 |
| ADDITIVES (pph) | | | | | |
| PED [6000] | 12 | | | | |
| PED [12000] | | 12 | | | |
| PED [300/600 k] | | | 12 | | |
| PED [100 k] | | | | 7 | 7 |
| LiCl | 0.5 | 0.5 | 0.5 | 0.5 | 0.5 |
| PROPERTIES | | | | | |
| 60° Gloss (%) | 18 | 50 | 94 | 57 | 92 |
| Tensile Str. (MPa) | 27.9 | 29.6 | 37 | 39 | 40.7 |
| Tensile Mod. (GPa) | 2.18 | 2.21 | 2.44 | 2.37 | 2.57 |
| Elongation (%) | 43 | 37 | 5 | 25 | 7 |
| Flex Strength (MPa) | 42.7 | 44.3 | 63.9 | 59.5 | 66.2 |
| Flex Mod (GPa) | 2 | 2.2 | 2.37 | 2.39 | 4 |
| IDI Emax (J) | 4.9 | 6.3 | 17.9 | 13 | 7.1 |
| Efail (J) | 6 | 8.1 | 30.3 | 18 | 8.4 |
| Izod, Notched (KJ/m$^2$) | 8.4 | 5.6 | 14.6 | 7.6 | 7.6 |
| HDT, (°C.) | 82 | 84 | 85 | 85 | 86 |

TABLE VI-continued

| SUMMARY OF EXAMPLES C-6 AND 29 TO 32 | | | | | |
|---|---|---|---|---|---|
| EXAMPLE | C-6 | 29 | 30 | 31 | 32 |
| Vicat 1 Kg (°C.) | 105 | 106 | 107 | 106 | 107 |
| % Charge Decay at T = 5 s. | 93 | 98 | 81 | 88 | 89 |

Significant % Charge Decay at T=5 seconds was demonstrated in Control C-6 and in Examples 29 to 32.

Control C-6 which utilized a PED having a molecular weight of 6000 produced a material having inherently low surface gloss. In comparison, Examples 29 and 31 which utilized PED's having molecular weights of 12,000 and 100,000 respectively demonstrated increased surface gloss while Example 30 which utilized a 50/50 mix of 300/600K PED achieved a very high gloss of 94%. In addition, the mechanical strength (flex and tensile), the IDI and notched Izod impact strengths and the thermal properties of Example 30 were improved over Control C-6. Examples 31 and 32 show that the absence of SMAMMA in the inventive "high gloss" composition increases the % gloss, but lowers the % Elongation and IDI strength.

EXAMPLES 33 TO 39

In Examples 33 to 38, test bars of antistatic nylon 6 homopolymer compositions containing PED, PEG, PEO, or PEDO and lithium chloride were tested for static charge decay abilities. In Example 39, a test bar of a nylon 6 copolymer containing about 11.7% by weight of caprolactone composition that employed lithium chloride was also tested for static charge decay abilities.

TABLE VII

| SUMMARY OF EXAMPLES 33 TO 39 | | | | | | | |
|---|---|---|---|---|---|---|---|
| EXAMPLE | 33 | 34 | 35 | 36 | 37 | 38 | 39 |
| COMPONENTS (% by weight) | | | | | | | |
| N6 | 100 | 100 | 100 | 100 | 100 | 100 | 88.3/11/7* |
| ADDITIVES (pph) | | | | | | | |
| PED [6000] | — | — | — | — | — | 13.2 | — |
| PEG [10,000] | — | 13.2 | — | 26.3 | — | — | — |
| PEO [300,000] | 6.1 | — | — | — | — | — | — |
| PEO [100,000] | — | — | — | — | 6.1 | — | — |
| PEDO | — | — | 13.2 | — | — | — | — |
| LiCl | 1.4 | 1.4 | 1.4 | 1.4 | 1.4 | 1.4 | 1.4 |
| INITIATOR | 2.1 | 2.1 | 2.1 | 2.1 | 2.1 | 2.1 | 2.1 |
| CATALYST | 15.8 | 15.8 | 15.8 | 15.8 | 15.8 | 15.8 | 15.8 |
| PROPERTIES | | | | | | | |
| % Charge Decay at T = 10s. | 83.1 | 100 | 89.1 | 100 | 100 | 100 | |

*Contains 88.3% by weight caprolactam and 11.7% by weight caprolactone.

In high gloss Examples 33 and 37, which used high molecular weight PEO (MW=300,000 and MW=100,000 respectively); high gloss Examples 34 and 36, which used PEG (MW=10,000); Example 35, which used PEDO; and Example 38, which used PED (MW=6,000); all of which used LiCl and a nylon 6 polymeric component resulted in compositions with comparably high static charge decay abilities.

Example 39 demonstrates that, in nylon 6 copolymer compositions, lithium chloride addition alone is sufficient to effect rapid static charge decay in the resulting composition.

EXAMPLES 40 TO 41

These Examples, which are included here for comparison purposes, illustrate compositions which do not exhibit the static charge decay abilities obtained with the compositions of the present invention. The molded specimens were prepared according to the compounding method. The compositions and their charge decay properties are set forth in Table VIII.

TABLE VIII

| SUMMARY OF COMPARATIVE EXAMPLES 40 TO 41 | | |
|---|---|---|
| EXAMPLE | 40 | 41 |
| COMPONENTS (% by weight) | | |
| ABS | 35 | 35 |
| SAN | 60 | 60 |
| SMAMMA | 5 | 5 |
| ADDITIVES (pph) | | |
| PED [300,000] | 12 | 12 |
| MGS | 0.55 | 2.5 |
| A-C | 0.5 | 0.5 |
| S-160 | 0.5 | 0.5 |
| I-1076 | 0.2 | 0.2 |
| PROPERTIES | | |
| % Charge Decay at T = 10s. | 14.7 | 17.2 |

Comparative Examples 40 to 41 demonstrate that the use of 0.55 and 2.5 pph magnesium stearate respectively, in combination with non-functionalized polyethylene oxide, as an antistatic agent in a styrenic polymer blend, results in compositions displaying markedly reduced static charge decay abilities. This may be due in part to the inability of magnesium stearate to complex with polyethylene oxide.

We claim:

1. An antistatic thermoplastic composition comprising:
   a. from 93 to 80% by weight of a styrenic polymer blend which comprises acrylonitrile-butadiene-styrene copolymers and styrene-maleic anhydride copolymers; and
   b. from 7 to 20% by weight of an antistatic agent which comprises a functionalized ethylene oxide polymer wherein the ethylene oxide polymer is selected from the group consisting of ethylene oxide homopolymers and blocked ethylene oxide copolymers having propylene oxide end blocks, wherein at least one internal block of the copolymer comprises ethylene oxide repeating units or ethylene oxide propylene oxide random repeating units, and wherein the functional group of the functionalized ethylene oxide polymer is selected from the group consisting of hydroxy, epoxy and amino groups; and a minor amount of an alkali metal salt capable of complexing with the functionalized ethylene oxide polymer;
wherein the sum of components (a) and (b) total 100% by weight and wherein the mole ratio of anhydride groups of the styrene-maleic anhydride copolymer to functional groups of the functionalized ethylene oxide polymer is in the range of about 5:1 to about 12:1.

2. The antistatic thermoplastic composition of claim 1 wherein the functionalized ethylene oxide polymer is anchored to the styrene-maleic anhydride copolymer by reaction with the anhydride groups.

3. The antistatic thermoplastic composition of claim 1 wherein the functionalized ethylene oxide polymer is an amine functionalized ethylene oxide polymer.

4. The antistatic thermoplastic composition of claim 3 wherein the mole ratio of free amine to anhydride is about 1:5.

5. The antistatic thermoplastic composition of claim 1 wherein the antistatic agent comprises:
a. from 99.9 to 90% by weight of a functionalized ethylene oxide polymer; and
b. from 0.1 to 10% by weight of an alkali metal salt; wherein the sum of components (a) and (b) total 100% by weight of the antistatic agent.

6. The antistatic thermoplastic composition of claim 1 wherein the styrenic polymer blend comprises:
a. from 98 to 80% by weight based on the total weight of the blend of acrylonitrile-butadiene-styrene copolymer; and
b. from 2 to 20% by weight based on the total weight of the blend of styrene-maleic anhydride copolymer,
wherein the sum of components (a) and (b) total 100% by weight.

7. The antistatic thermoplastic composition of claim 6 wherein the antistatic agent comprises:

a. from 99.9 to 90% by weight of a functionalized ethylene oxide polymer; and
b. from 0.1 to 10% by weight of an alkali metal salt; wherein the sum of components (a) and (b) total 100% by weight of the antistatic agent.

8. The antistatic thermoplastic composition of claims 1, 5 or 7 wherein the alkali metal salt is selected from the group consisting of lithium chloride, lithium bromide, lithium acetate, lithium carbonate, lithium trifluoromethyl sulphonate and sodium acetate.

9. The antistatic thermoplastic composition of claim 1 wherein the antistatic agent is added to the styrenic polymer blend during a melt blending process.

10. The antistatic thermoplastic composition of claims 1, 5, or 7 wherein the functionalized ethylene oxide polymer is an amine functionalized ethylene oxide homopolymer.

11. The antistatic thermoplastic composition of claims 1, 5, or 7 wherein the functionalized ethylene oxide polymer is an amine functionalized ethylene oxide block copolymer wherein one internal block comprises ethylene oxide repeating units.

12. The antistatic thermoplastic composition of claim 11 wherein the amine functionalized ethylene oxide block copolymer has the structure

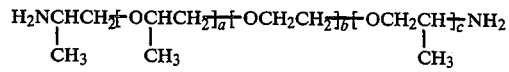

wherein a+c is about 2.5 and b ranges from about 8.5 to about 86.0.

13. The antistatic thermoplastic composition of claims 1, 5, or 7 wherein the functionalized ethylene oxide polymer is an amine functionalized ethylene oxide block copolymer wherein one internal block comprises ethylene oxide propylene oxide random repeating units.

* * * * *